United States Patent [19]

Stachejko

[11] 3,711,793

[45] Jan. 16, 1973

[54] HIGH POWER MICROWAVE SWITCH INCLUDING A PLURALITY OF DIODES AND CONDUCTIVE RODS

[75] Inventor: Vitaly Stachejko, Willingboro, N.J.

[73] Assignee: RCA Corporation

[22] Filed: Dec. 24, 1970

[21] Appl. No.: 101,374

[52] U.S. Cl. ........................333/97 S, 333/7, 333/13

[51] Int. Cl. ............................H01p 1/10, H01p 3/06

[58] Field of Search .....333/97 S, 97 R, 73 C, 13, 17, 333/70 R; 307/237, 320, 259, 317

[56] References Cited

UNITED STATES PATENTS

| | | | |
|---|---|---|---|
| 3,131,365 | 4/1964 | Hoover | 333/97 S |
| 3,245,014 | 4/1966 | Plutchok et al. | 333/97 |
| 2,890,420 | 6/1959 | Bradburd | 333/70 R |
| 2,942,197 | 6/1960 | Madsen et al. | 333/76 X |
| 2,959,778 | 11/1960 | Bradley | 333/13 X |
| 3,098,937 | 7/1963 | Martens | 333/17 X |
| 3,202,942 | 8/1965 | Garver et al. | 307/237 X |
| 2,287,665 | 11/1966 | Brunton | 333/7 |
| 3,448,415 | 6/1969 | DeLoach, Jr. | 333/73 R X |

OTHER PUBLICATIONS

Brown, N. J., "Design Concepts for High Power Pin Diode Limiting," MTT 15, 12–67, pp. 732–742.

Leenov, D., "The Silicon Pin Diode as a Microwave Radar Protector at Megawatt Levels," IEEE Trans. on E.D. 2–1964, pp. 53–61.

Garver, et al., "Broad-Band Tem Diode Limiting," MTT 9–1962 pp. 302–310.

Mott, H., "The Harmonics Produced by a Pin Diode in a Microwave Switching Application," MTT 3–1967, pp. 181–181.

Garver et al., "Filters for High-Speed Diode Modulators & Demodulators," MTT 7–1967, pp. 390–397.

Chao, G., "A Matched Microwave Limiter," MTT 5–1970 pp. 283–284.

Ragen, G. L., "Microwave Transmission Circuits" McGraw-Hill 1948, pp. 311–314.

*Primary Examiner*—Herman Karl Saalbach
*Assistant Examiner*—Wm. H. Punter
*Attorney*—Edward J. Norton

[57] ABSTRACT

A high power, solid state, coaxial microwave switch wherein a plurality of diodes are mounted between the inner and outer conductors and a plurality of conductive rods are connected between the inner and outer conductors. The rods are selected such that the inductance of the rods and the capacitance of the diodes when reversed biased provide a resonant circuit at a predetermined frequency, whereby microwave energy incident upon the reversed biased diodes passes through the switch with little attenuation. When forward biased, the diodes provide a low impedance, whereby microwave energy incident thereon is substantially reflected.

4 Claims, 3 Drawing Figures

INVENTOR.
Vitaly Stachejko
BY Edward J. Norton
ATTORNEY

HIGH POWER MICROWAVE SWITCH INCLUDING A PLURALITY OF DIODES AND CONDUCTIVE RODS

The invention herein described was made in the course of or under a contract or subcontract thereunder with the Department of the Air Force.

This invention relates to microwave switches and more specifically high power, solid state switches.

In the past, gas transmit-receive (T-R) tubes have been widely used to accomplish high power switching at microwave frequencies. The problems attendant with gas T-R tubes are related to their switching speeds, system noise performance and turn-on voltage spikes which may feed through to the circuitry to be protected.

To overcome some of the inherent problems of gas T-R tubes, designers have investigated the use of semiconductor diodes for microwave switches at high power levels. In particular, silicon Positive Intrinsic Negative (PIN) diodes have been proposed for use in devices such as duplexers, switches, modulators and phase shifters.

One of the most significant problems in the use of solid state switches at microwave frequencies and high power levels has been the destruction of the solid state device itself due to the extremely high temperature rises the devices are required to handle.

Therefore, in the production of a high power microwave solid state switch, one must not only be concerned with performance characteristics such as switching speeds, isolation and insertion losses but also the ability to operate in and dissipate extremely high power temperature without exceeding the rise limits of the solid state device.

The switching circuit herein described, by virtue of its construction, prevents exceeding the temperature rise limits of the solid state device, as well as providing the required performance characteristics for a high power microwave switch.

In accordance with the present invention, a microwave switch is provided in a coaxial line having an inner and an outer conductor. A plurality of diodes, having a low impedance when forward biased and a certain capacitance when reversed biased, are connected between the inner and outer coaxial conductors. A plurality of conductive rods, having a certain inductance, are also connected between the inner and outer coaxial conductors. The inductance of the rods and the capacitance of the reversed biased diodes provide a resonant circuit, for passing microwave energy in a predetermined frequency range. Means are also provided for selectively forward biasing the diodes whereby the low impedance circuit reflects microwave energy incident upon the diodes.

Figures 1, 2, 3:
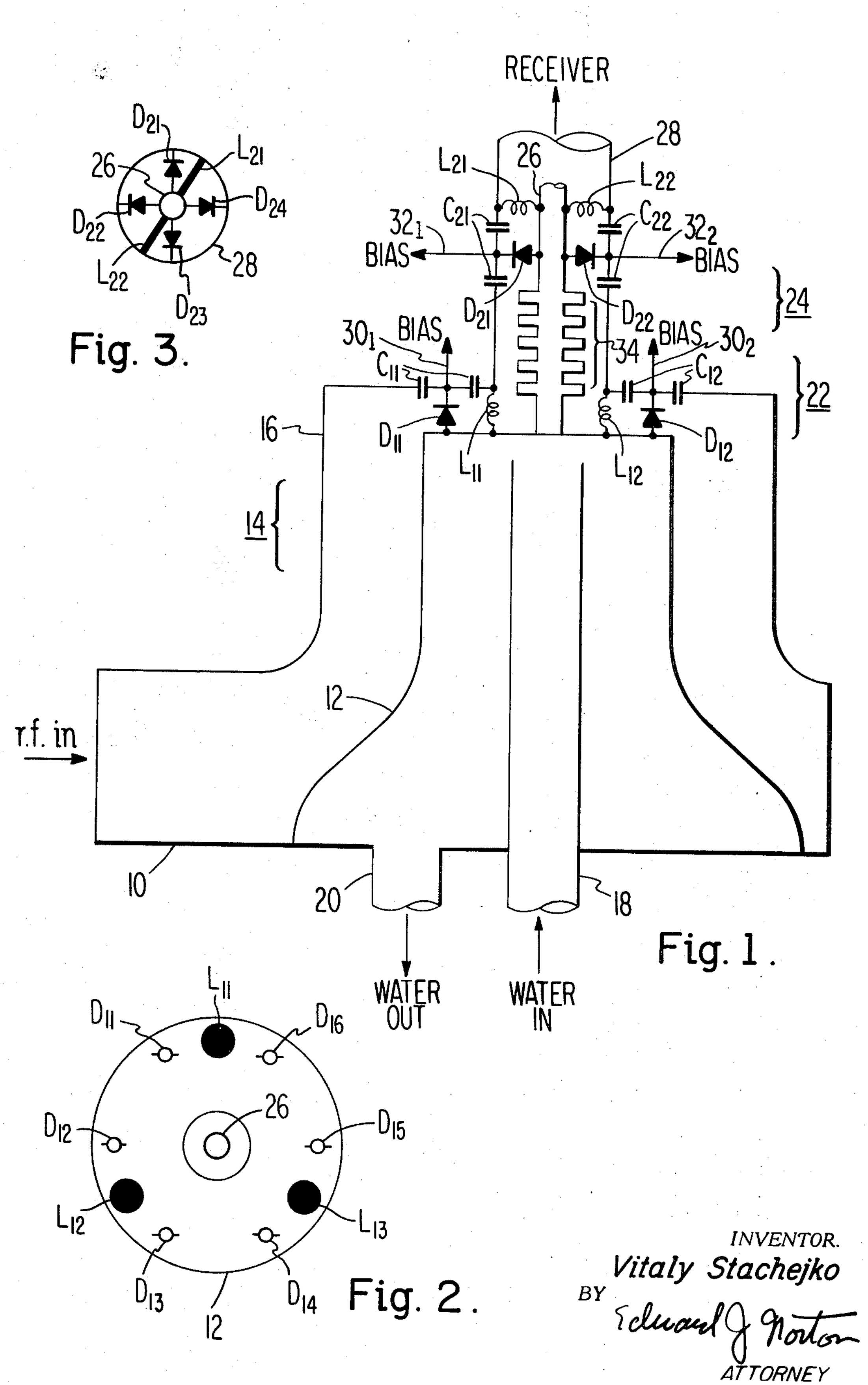
FIG. 1 is a part physical and part schematic sketch of the preferred embodiment of the invention.
FIG. 2 shows a typical arrangement of diodes and conductive rods in the region of the step transition shown in FIG. 1.
FIG. 3 shows a typical arrangement of diodes and conductive rods in the smaller coaxial line of FIG. 1.

The diodes selected for the switch herein disclosed consist of PIN diodes having P+ and N+ regions diffused into opposite faces of a silicon chip of high intrinsic resistivity. The silicon chip is metallurgically bonded to metal pins across the full face of the chip on both sides thereby assuring the highest possible electrical and thermal conductivity between the chip and the external connections.

Referring now to FIG. 1, a high power microwave r.f. signal is applied to a waveguide, represented schematically by 10, through some appropriate means (not shown). Waveguide 10 may be part of a transition from one size waveguide to another (not shown) since waveguide 10, in the embodiment of FIG. 1, is made compatible with a transition from a waveguide to a coaxial transmission line and such a transition may require a reduced waveguide size.

The preferred embodiment utilizes a standard wine glass transition schematically shown as 12 to go from the waveguide 10 to the coaxial line shown generally as 14. Coaxial line 14 comprises an inner conductor provided by the transition 12 and an outer conductor represented by 16 which is intended to be electrically contiguous with waveguide 10. In the embodiment shown coaxial line 14 is designed to have a 50 ohm characteristic impedance.

Since the center conductor 12 of coaxial line 14 will be subject to high temperatures when high power is passed through line 14, cooling is provided for heat dissipation purposes. Tube 18 is an inlet for a coolant, such as water, and tube 20 is the outlet. The arrangement of tubes 18 and 20 allow a flow of coolant to dissipate the heat generated on the inner conductor 12 of coaxial line 14.

A step transition shown generally as 22 is provided to reduce the diameter of inner and outer conductors 12 and 16 of line 14. The smaller coaxial line on the other side of transition 22 is shown generally as 24. Coaxial line 24 comprises an inner conductor 26 and an outer conductor 28. Conductors 26 and 28 are designed such that coaxial line 24 has a characteristic impedance which is the same as coaxial line 14, that is 50 ohms in the present example. Coaxial line 24 continues on to the device (not shown) to be protected from the incoming r.f. high power. In FIG. 1 the device to be protected is designated as a receiver.

In the region of the step transition 22, a plurality of diodes, two in FIG. 1, $D_{11}$ and $D_{12}$ are positioned parallel to the longitudinal centerline common to coaxial lines 14 and 24. Diodes $D_{11}$ and $D_{12}$ are connected from the inner conductor 12 to the outer conductor 16 in the plane of the step transition 22 of outer conductor 16.

It has been found that the change to a smaller size coaxial line, that is line 14 with respect to coaxial line 24, tends to increase the isolation of the switch. There are other advantages which will become evident from the description which follows.

The PIN diodes $D_{11}$ and $D_{12}$ have a certain capacitance when reversed biased. It is known in the art that when diodes physically occupy a sizable distance, from one point to another point in a coaxial line, the diodes will exhibit a parasitic inductance. The parasitic inductance will interact with the capacitance of the diodes and disturb the resonant frequency of a resonant circuit of which the diodes are a component.

It has been found that positioning diodes $D_{11}$ and $D_{12}$ as shown in FIG. 1 reduces the parasitic inductance effects since the diodes are connected a very short distance from inner conductor 12 to outer conductor 16. The step transition 22 lends itself to this desirable positioning of diodes $D_{11}$ and $D_{12}$. Since the number of diodes in the step transition region will have an effect on several parameters such as, power handling capability, isolation and insertion loss, the exact number of diodes will depend upon the desired results.

In FIG. 2, for example, which is a view along a plane drawn perpendicular to the line 14 at the transition 22 of a switch as constructed in the manner of that shown schematically in FIG. 1, there are six diodes in the group of diodes $D_{11}$–$D_{16}$ located in the step region 22. These six diodes are symmetrically located on the surface of an imaginary cylinder which is coaxial with the coaxial lines 14 and 24. The diodes however need not necessarily be symmetrical with lines 14 and 24 or with each other.

Also located in the step region 22 is a group of conductive rods, two in FIG. 1, schematically represented as inductors $L_{11}$ and $L_{12}$. The rods $L_{11}$ and $L_{12}$ are positioned parallel to diodes $D_{11}$ and $D_{12}$ and also connect inner conductor 12 to outer conductor 16 in the plane of the step transition 22 of outer conductor 16. The main function of conductive rods $L_{11}$ and $L_{12}$ is to provide the proper amount of inductance such that the capacitance of diodes $D_{11}$ and $D_{12}$ when reversed biased and the inductance of rods $L_{11}$ and $L_{12}$ are resonant at a predetermined frequency. The length and diameter of rods $L_{11}$ and $L_{12}$ determine the inductance thereof. The rods $L_{11}$ and $L_{12}$ also aid in removing heat developed on inner conductor 12 by providing a thermal conduction path from inner conductor 12 to outer conductor 16.

In a typical arrangement of diodes and rods in the step region 22 as shown in FIG. 2, three rods $L_{11}$ to $L_{13}$ were found to provide the desired amount of inductance. With three rods $L_{11}$ to $L_{13}$, and six diodes $D_{11}$ to $D_{16}$ in the step transition 22 it was found that approximately 64 percent of the high power microwave energy appearing in the step region 22 impinges on the diodes in that region and roughly 34 percent of the power passes through the three rods $L_{11}$ to $L_{13}$. Had the rods not been used, it is estimated that four more diodes would be required to handle the same power level. Additional diodes in the region of transition 22 would have a deleterious effect upon the bandwith of the switching circuit. Therefore the rods $L_{11}$ to $L_{13}$ provide the desired inductance and aid in heat dissipation and broad band operation.

Biasing for the diodes $D_{11}$ and $D_{12}$ in FIG. 1 is provided from an appropriate driver circuit (not shown) via lines $30_1$ and $30_2$, one biasing line for each diode. The biasing is selectively applied to simultaneously forward bias diodes $D_{11}$ and $D_{12}$ at times when it is desired to block the microwave energy from passing through the switch.

A group of two capacitors $C_{11}$ and $C_{12}$, one group for each of diodes $D_{11}$ and $D_{12}$ are located in the step transition region 22. Capacitors $C_{11}$ and $C_{12}$, provide a return path for the microwave energy passed through the diodes while blocking the d.c. biasing signals on lines $30_1$ and $30_2$ from a return path on the outer conductor 16. Physically, capacitors $C_{11}$ and $C_{12}$ are annular and surround the connection of the diodes to the outer conductor 16. Hence, schematically capacitors $C_{11}$ and $C_{12}$ are shown in FIG. 1 on each side of their respective diodes. Alternatively, one capacitor, circular in configuration, may be used in place of capacitors $C_{11}$ and $C_{12}$, as long as the the d.c. bias is blocked and a return path for the microwave energy is provided.

In coaxial line 24, another grouping of diodes, rods and bypass capacitors are located. The two diodes shown in line 24 of FIG. 1 are designated as $D_{21}$ and $D_{22}$, the two conductive rods are represented schematically as the inductances $L_{21}$ and $L_{22}$ and the bypass capacitors are designated as $C_{21}$ and $C_{22}$.

The diodes $D_{21}$ and $D_{22}$ and the rods represented by $L_{21}$ and $L_{22}$ in line 24 are connected between inner conductor 26 and outer conductor 28 and are substantially perpendicular to the longitudinal centerline of coaxial lines 24 and 14.

The diodes, rods and capacitors in line 24 provide the very same functions as previously described for the diodes, rods and capacitors in the step region 22.

In the typical arrangement of diodes and rods in line 24 shown in FIG. 3, which is a view along a plane perpendicular to line 24 of a switch as constructed in the manner of that shown schematically in FIG. 1, there are four diodes $D_{21}$ to $D_{24}$, and two rods $L_{21}$ and $L_{22}$.

Biasing for diodes $D_{21}$ and $D_{22}$ in FIG. 1 is provided from a source (not shown) via lines $32_1$ and $32_2$.

In the embodiment of FIG. 1 separate bias lines are shown for each diode in the switching circuit. However, since the diodes should all be forward biased at the same time, a single driver circuit may be used to forward bias all the diodes, $D_{11}$, $D_{12}$, $D_{21}$ and $D_{22}$ at a selected time. In a particular application it may be desired to use separate driver circuits in order to reduce the current requirement for a single driver circuit.

Diodes $D_{21}$ and $D_{22}$ and rods $L_{21}$ and $L_{22}$ in FIG. 1 provide a significant improvement in the performance of the switch. The grouping of diodes $D_{21}$ and $D_{22}$ and rods $L_{21}$ and $L_{22}$ are approximately a quarter wavelength away from diodes $D_{11}$ and $D_{12}$ and rods $L_{11}$ and $L_{12}$. It has been found that this arrangement tends to increase the isolation of the switch while nearly tripling the bandwidth.

Had the number of diodes in the group of diodes $D_{11}$ and $D_{12}$ been doubled, and diodes $D_{21}$ and $D_{22}$ and rods $L_{21}$ and $L_{22}$ not been used, the isolation of the switching circuit would go up by roughly 6 db, but the bandwidth would tend to go down and the insertion loss would tend to go up.

As a further improvement in bandwidth the quarter wave section of coaxial line 24 between the diodes $D_{11}$ and $D_{12}$ and diodes $D_{21}$ and $D_{22}$ may include a low pass filter section 34. Filter 34 is a standard coaxial type filter comprising a plurality of cylindrical sections along inner conductor 26 of line 24.

In a typical operation of the switch as a replacement for a gas T-R tube, waveguide 10 may be coupled back to an antenna through a hybrid, with the transmitter also tied into the hybrid. Coaxial line 24 may lead into a receiver. When the transmitter is rendered operative, all of the diodes in both lines 14 and 24 are forward biased and any microwave energy passing through waveguide 10 and coaxial line 14 will be reflected by the low impedance represented by the forward biased diodes and the inductive rods.

A switch as herein described was built using Unitrol PIN diodes UM 4906C, the rods had a diameter of about 130 mils each, coaxial line 14 was a 50 ohm line with a 3⅛ inch outer conductor diameter, coaxial line 24 was a 50 ohm line with a ⅞ inch outer conductor diameter and a water coolant at a flow rate of 1 gallon per minute was used. Six diodes and three rods were used in step region 22, while four diodes and two rods were used in coaxial line 24.

The switching circuit was designed for a center frequency of 1320 MHz with a 10% bandwith. The insertion loss was less than 0.6db and the isolation was greater than 75 db across the band. The switching circuit described is capable of handling 5 Megawatts of peak power and 300 Kilowatts of average power at the frequencies designated above.

What is claimed is:

1. A microwave switch in a coaxial line, said line having first and second sections of concentric inner and outer conductors with a step transition therebetween, the first and second sections being centered about a given longitudinal axis and having the same characteristic impedance, the second section having inner and outer conductors smaller in diameter than the inner and outer conductors of the first section, said switch comprising:
   - a first plurality of diodes connected between the inner and outer conductors of the first section of line in the region of the step transition and lying parallel to said longitudinal axis, said first plurality of diodes having a certain capacitance when reversed biased and a low impedance when forward biased;
   - a first plurality of conductive rods, equal to half the number of diodes in said first plurality of diodes, connected between the inner and outer conductors of the first section of line in the region of the step transition and lying parallel to said longitudinal axis, said first plurality of rods providing a certain inductance, the capacitance of the diodes and the inductance of the rods in the first section of line providing a first resonant circuit at a predetermined frequency of operation;
   - a second plurality of diodes connected between the inner and outer conductors of the second section of line and lying in a plane perpendicular to the longitudinal axis;
   - a second plurality of conductive rods, equal to half the number of diodes in said second plurality of diodes, connected between the inner and outer conductors of the second section of line and lying in a plane perpendicular to the longitudinal axis, said second plurality of diodes and said second plurality of rods providing a second resonant circuit at said predetermined frequency of operation;
   - a distributed low pass filter coupling said first resonant circuit to said second resonant circuit, said filter being substantially a quarter wavelength long at said predetermined frequency of operation; and
   - means for selectively biasing said first and second plurality of diodes, said first and second resonant circuits passing microwave energy incident thereon when said first and second plurality of diodes are reversed biased and reflecting microwave energy incident thereon when said first and second plurality of diodes are forward biased.

2. The switch according to claim 1 further comprising a first plurality of capacitors, connected in the outer conductor of the first section of line, said first plurality of capacitors being equal in number to the number of diodes in said first section of line and a second plurality of capacitors, connected in the outer conductor of the second section of line, said second plurality of capacitors being equal in number to the number of diodes in said second section of line, said first and second plurality of capacitors providing a return path for the microwave energy incident on said first and second plurality of diodes respectively.

3. The switch according to claim 1 wherein said first and second plurality of diodes comprise PIN diodes.

4. The switch according to claim 1 wherein said diodes and rods in the first section of line are positioned equidistant from said longitudinal axis.

* * * * *